Dec. 18, 1928.
F. O. BALL ET AL
1,695,705
CONSTANT LEVEL DEVICE
Filed May 10, 1926
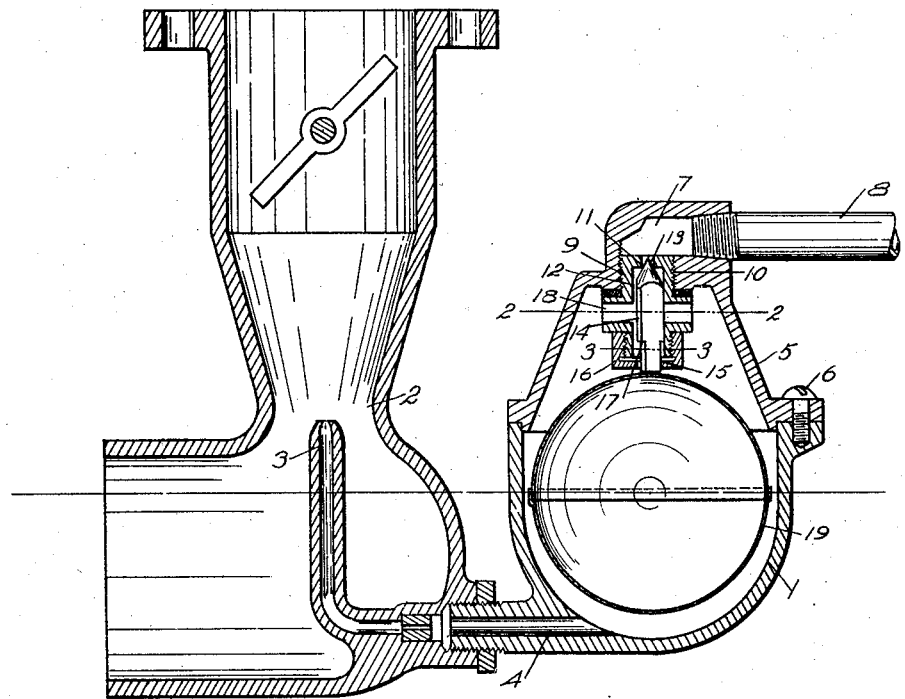
FIG.1.
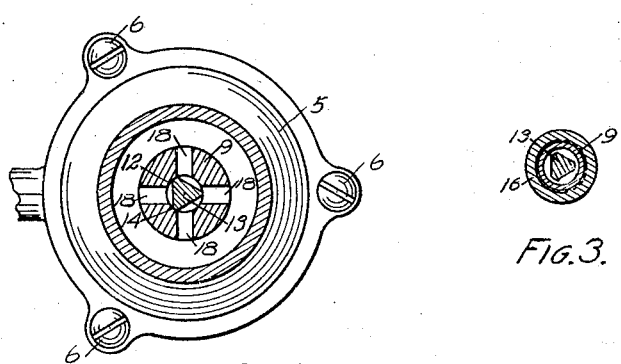
FIG.2.
FIG.3.
INVENTORS
Frederick O. Ball &
Thomas M. Ball
BY
ATTORNEYS.

Patented Dec. 18, 1928.

1,695,705

UNITED STATES PATENT OFFICE.

FREDERICK O. BALL AND THOMAS M. BALL, OF DETROIT, MICHIGAN, ASSIGNORS TO BALL & BALL CARBURETOR COMPANY, A PARTNERSHIP COMPOSED OF FREDERICK O. BALL AND CORNELIA M. BALL, OF DETROIT, MICHIGAN.

CONSTANT-LEVEL DEVICE.

Application filed May 10, 1926. Serial No. 108,197.

One of the common methods of forming a constant level device is by means of a float-controlled valve leading to a float chamber. The present invention is designed to improve this type of constant level device. With the present device the controlling, or inlet valve to the float chamber is operated upon directly by the float, the float being preferably spherical in form and guided by the walls of the chamber. In this manner all slack or lost motion in the device is prevented and the operation, or control made more accurate. At the same time a very simple device is provided. Features and details of the invention will appear from the specification and claim.

The invention is illustrated in the accompanying drawings as follows:—

Fig. 1 shows a central section through a float chamber connected to an ordinary carburetor.

Fig. 2 a section on the line 2—2 in Fig. 1.

Fig. 3 a section on the line 3—3 in Fig. 1.

1 marks a float chamber, 2 a carburetor passage, 3 a fuel nozzle leading to the carburetor passage, and 4 a passage leading from the float chamber to the nozzle.

A cover 5 is arranged on the float chamber and secured thereon by screws 6. An inlet passage 7 is formed in the upper end of the cover 5 and a supply pipe 8 leads to this passage.

A controlling valve is carried by a fitting 9 which is screwed into a screw-threaded opening 10 leading from the underside of the cover, or interior of the completed float chamber into the passage 7. The fitting has a valve seat 11 and a valve guiding surface 12 extending through the fitting. A needle valve 13 operates on the seat 11. It is preferably formed from stock having a polygonal cross section, as shown a triangular cross section forming a guide 14. This operates within cylindrical guiding surfaces 12 and still leaves a passage between the walls of this surface and the guide portion 14. The lower end of the valve is reduced in size at 15 and this reduced portion extends through a flanged nut 16 screwed on the end of the fitting 9, and the shoulder 17 formed at the upper end of the reduced portion engages this flanged nut, thus limiting the opening movement of the valve. The fitting has radial openings 18 leading from the central passage and discharging into the float chamber.

A float 19 is arranged in the float chamber. This is preferably of spherical shape and is guided by the surrounding walls of the float chamber 1, there being sufficient clearance between the float and the walls of the chamber to permit the free passage of liquid and at the same time the relation is close enough to prevent any destructive side motion. The valve rests directly on the wall of the float and inasmuch as the float is free to rotate, or move, different surfaces of the float are brought into engagement with the valve, the float being perfectly free to move except as guided by the chamber walls. With this construction all connecting links ordinarily used between the float and the valve are dispensed with and all slack or lost motion thus avoided. As a result the control is very accurate and surging is almost entirely avoided. At the same time a very cheap and readily assembled structure is formed and one that is very durable.

Further the direct association of the valve and float and the mounting of the valve in the cover makes it possible to gauge the controlled level by the float very accurately in the ordinary process of manufacture and without individual adjustment of each chamber as is necessary with many constructions. The cover as it will be noted is cup-shaped and extends down over the float giving clearance for the upper part of the float and a housing space for the valve. This makes a simple construction and simplifies the making of the parts.

What we claim as new is:—

In a constant level device, the combination of a float chamber; a cover for the chamber; a valve controlling the inflow to the chamber, said valve being mounted in and removable with the cover; and a spherical float guided by the chamber walls and controlling the valve by direct contact of the walls of the float with the valve, the float being free to move to vary the point of contact, the cover being cup-shaped and the part between the cover and the chamber being below the top of the float.

In testimony whereof we have hereunto set our hands.

FREDERICK O. BALL.
THOMAS M. BALL.